United States Patent Office 2,875,060
Patented Feb. 24, 1959

2,875,060
FOOD COMPOSITION AND METHOD OF PRESERVING SAME

Ralph T. Holman, Austin, Minn., assignor to Regents of the University of Minnesota, Minneapolis, Minn., a corporation of Minnesota Application May 27, 1955, Serial No. 511,459

7 Claims. (Cl. 99—2)

This invention relates to food and feed compositions and methods of preserving perishable components thereof. More particularly the invention relates to the use of urea complexes of essential fatty acid compounds in foods to protect the fatty acid compounds from autoxidation and improve the vitamin A retention in the foods by lessening oxidative destruction of vitamin A.

When fat incorporated in diets as a supplement contains essential fatty acids undesirable rancidity often develops and essential nutrients are destroyed, at least partially, by oxidation with atmospheric oxygen. Refrigeration is required to reduce this tendency, but, over long periods of time, mere refrigeration may not be enough to prevent autoxidation.

It has been known that urea forms inclusion compounds with a variety of long chain normal aliphatic compounds. In the presence of such substances, urea crystallizes in a hexagonal lattice in which adequate space remains to harbor the "guest molecules." Long chain fatty acids and mono-esters form such urea-inclusion compounds easily, and unsaturated acids or esters are not subject to autoxidation or polymerization while held in such a complex. Urea-inclusion compounds of fatty acid compounds contain approximately 25% fatty acid.

It has now been discovered that urea-inclusion compounds of essential fatty acids and derivatives, such as esters, may be used to incorporate unsaturated fatty acids in diets. By this means the essential fatty acid can be administered steadily in the diet rather than by intermittent oral dosing. The urea-inclusion compound is stable as long as it remains dry, and the essential fatty acid is not released until the complex arrives in the gastrointestinal tract of the animal subject. Thus it is assured that the subject receives essential fatty acids and not merely oxidation products derived therefrom, and that the dosage is spread more evenly throughout the period of supplementation. Essential fatty acid compounds administered as inclusion compounds are still effective in curing fat deficiency. At the same time vitamin A in the diet retains its potency at a higher level over a longer period of time.

The principal object of this invention is to provide a stabilized food composition supplemented with essential fatty acid compounds in the form of urea-inclusion compounds and a method of preserving such foods from autoxidation of fatty acid compounds and of preserving vitamin A potency by the use of inclusion compounds.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

Figure 1:
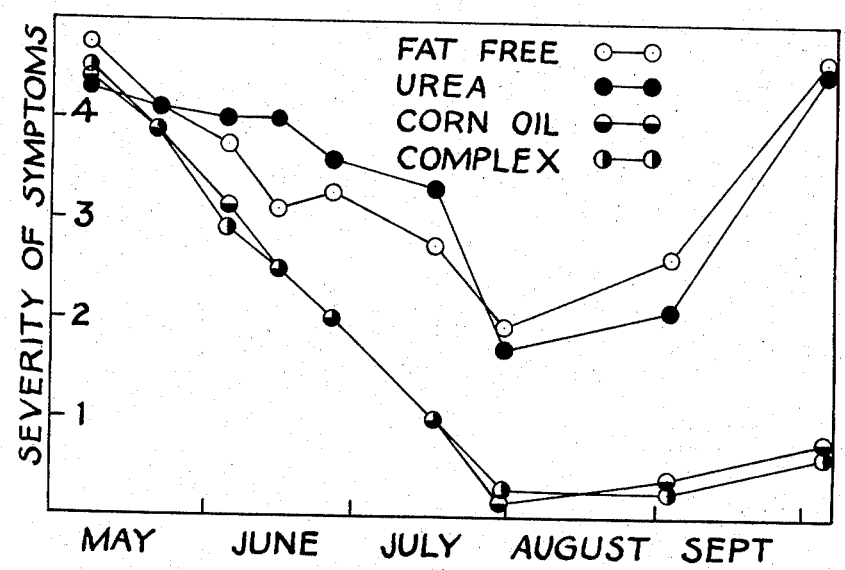
Figure 1 is a graph showing changes in dermal symptoms in experimental fat-deficient rats when fed with diets supplemented with urea, corn oil or urea-inclusion compound of corn oil ethyl esters. Each group contained eight rats.

Broadly stated, the invention comprises food compositions for both human consumption and for feeding of domesticated lower animals, which are supplemented or fortified by the addition of essential fatty acid compounds or other unstable nutrients or therapeutic agents in the form of urea complexes or urea-inclusion compounds. The invention also includes the method of preserving such compositions against rancidity and loss of nutritive value due to autoxidation and improved vitamin A potency retention by the addition to such food compositions of essential fatty acid compounds in urea complex form.

It has been shown that urea-inclusion compounds containing essential fatty acid compounds cured fat-deficient experimental rats of their symptoms or increased the arachidonic acid contents of their carcasses. Measurement of the total arachidonic acid content of the rat carcass was chosen as the most direct criterion of essential fatty acid utilization.

Urea-inclusion compounds may be used in the diet in effective amounts up to a total of about 15 percent by weight of the total food intakes without ill effect due to the presence of large amounts of urea in the system. Where the food intake can be readily controlled, as in the case of especially prepared diets for experimental animals, the desired amount of inclusion compound may be incorporated directly. Where the amount of food intake is not so readily controlled, the essential fatty acids may be administered as inclusion compounds in more concentrated form, but in amounts based upon average estimated total food intake to introduce the desired level of essential fatty acid. It must be remembered that only approximately 25% of fatty acid or ester is included in the urea complex so that the inclusion compound is used in amounts about four times the desired quantity of fatty acid.

The invention is illustrated by the examples as carried on experimental animals as follows:

Each experimental group consisted of 8 four-month-old Sprague-Dawley female rats which had been placed on a fat-free diet at weaning age. The fat-free diet consisted of 20 parts vitamin-free casein, 72 parts sucrose, 4 parts Hubbell, Mendel and Wakeman salts, and 4 parts alphacel powdered cellulose. To each kilogram of the above mixture the following vitamins were added: 450 mg. ascorbic acid, 65 mg. calcium pantothenate, 1.2 gm. inositol, 5 mg. 2-methyl-1, 4-naphthoquinone, 30 mg. niacin, 72 mg. thiamin hydrochloride, 1.2 gm. choline chloride, 12 mg. folic acid and 4.5 micrograms biotin. To each kilogram of this basal ration the following fat-soluble vitamins were added: 5 mg. beta carotene, 20 millimicrograms calciferol and 100 mg. alpha-tocopherol.

Three experimental diets were prepared from the same vitamin enriched basal ration, each containing one of the following: (1) 80 gm. corn oil ethyl ester urea-inclusion compound, (2) 20 gm. corn oil, or (3) 60 gm. urea per kilogram of basal diet. (Diets 1 and 2 are approximately equivalent in linoleic acid content.) The vitamin-enriched fat-free diet described above was used as a control.

The ethyl esters of corn oil fatty acids were prepared by alkaline ethanolysis of corn oil by warming 250 ml. absolute ethanol, in which 2.7 gm. sodium had been dissolved, with each kilogram corn oil for three hours at 60 to 70° C. The ethyl esters were decanted from the glycerol layer, washed several times with hot distilled water, and were then dried. The urea-inclusion compound was then prepared by warming 3 kg. of granular urea and 1 kg. of corn oil ethyl esters with enough methanol to make hand stirring effective near the boiling point of methanol. Most of the methanol was then evaporated, and the inclusion compound was washed twice with light petroleum ether to remove any unbound esters.

Individual rats were inspected periodically for symptoms of essential fatty acid deficiency. Severity of symptoms was judged by scaliness of feet (range 0 to 3), scaliness of tail (range 0 to 4) and roughness of haircoat (range 0 to 2). Total scores were averaged for each group.

At the end of the experiment 4 of the 8 rats of each group were selected at random and killed. Each carcass was put through a meat grinder and then minced in a Waring Blendor with hot ethanol. The extraction was repeated twice with boiling ethanol and once with boiling Skellysolve F, a C-6 to C-8 hydrocarbon solvent. The solvent was partially removed from the combined extracts, the extract diluted with Skellysolve F, and washed three times with water. The lipid solution was then dried over anhydrous sodium sulfate, the solvent was removed and the lipid was weighed.

The content of arachidonic acid in the lipid samples was determined by alkaline isomerization using the conditions of Herb et al. (J. Am. Oil Chemists' Soc. 29:546). Calculation of arachidonic acid content was made using the following equation, which provides appropriate corrections for the presence of pentaene and hexaene fatty acids:

Percent arachidonic
acid$=100$ $(0.165k_{3150\ A.}-0.0236k_{3460\ A.}+0.0079k_{3750\ A.})$ $$k=\frac{\log I_0/I}{ed}$$

where c. is measured in grams per liter.

From the values so gained, and from the weight of the total lipid extracted, the total arachidonic acid per rat was calculated.

The record of dermal symptoms during the course of the experiment is shown in Figure 1. It will be noticed that those groups receiving the essential fatty acid, linoleic acid, either in corn oil or as the urea-inclusion compound of its ethyl ester, demonstrated parallel cures. Those groups of animals receiving no essential fatty acid showed roughly parallel changes in severity of symptoms. The animal colony is housed in a room without humidity control, and during the early summer the high humidity was reflected in spontaneous relief of dermatitis. However, later in the summer, the dermatitis of the fat-deficient groups again became severe, and the differences in responses of the various groups became more striking. The experiment demonstrated that from the point of view of response of dermal symptoms, essential fatty ester in urea-inclusion-compound form was effective in relieving fat deficiency.

Figure 2:
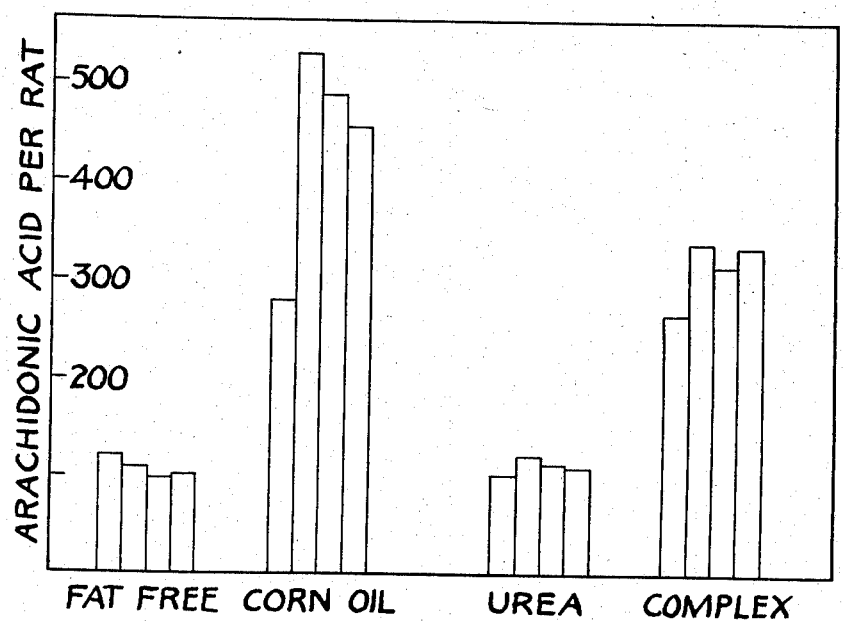
Figure 2 is a graph depicting the arachidonic acid contents of experimental fat-deficient rats which had received supplements of corn oil, urea or urea-inclusion compound of corn oil ethyl esters. Each bar represents one rat.

Assessing the severity of essential fatty acid-deficiency by arachidonic acid content of the animals showed conclusively that essential fatty-acid-deficiency was cured by corn oil and by the urea-inclusion compound of corn oil esters. These results are shown in Figure 2.

The use of high levels of urea in diets such as used here may exert some physiological strain upon the animals. Urea is a diuretic, and this was reflected in a higher water intake of the anmals receiving urea. The level of 6% urea in the diet lies within the therapeutic dose range of urea, and was not associated with any injurious effects upon the rats, although its dosage was continued over a period of several weeks. Although somewhat greater quantities of urea may be used without the diets becoming unacceptable to the animals, as a general rule the inclusion compound should not be present in amounts greater than about 15 percent by weight.

Vitamin A or carotene present in an oil, or in a ration containing oil, is subject to coupled oxidation if the fatty portion of the ration undergoes autoxidation. Incorporation of unsaturated esters in a dry diet in the form of urea-inclusion compounds rather than as the free ester lessens the oxidative destruction of these substances. To illustrate this, two rations were compounded similar to those described in the examples above. One contained 0.625 mg. vitamin A plus 2 gm. ethyl linoleate/100 gm. ration. The other contained 0.625 mg. vitamin A plus 8.0 gm. ethyl linoleate urea-inclusion compound/100 gm. ration. These rations were analyzed for their relative vitamin A content immediately and again after standing exposed to air at room temperature for 40 days. The unsaponifiable matter from 10 gm. of each ration was taken up in 10 ml. ethanol and the optical densities at 3250 angstroms were measured to indicate the relative amounts of vitamin A remaining. The data gained are summarized in Table 1 and indicate that the loss of vitamin A was substantially less when linoleate-inclusion compound was incorporated in the diet than when an equivalent amount of free ethyl linoleate was present. The vitamin A itself is not included in the urea complex. Only the essential fatty acid or ester is protected in the inclusion compound. The improved stability of vitamin A results from suppression of coupled oxidation by protecting the fatty portion of the ration against autoxidation.

TABLE

Stability of vitamin A in a dry diet in the presence of a urea-inclusion compound

| Ration | Relative Optical Density at 3,250 Angstroms | | Vitamin A Remaining, percent |
| --- | --- | --- | --- |
|  | Fresh | 40 days |  |
| Vitamin A+ethyl linoleate | 1.175 | 0.168 | 14.3 |
| Vitamin A+ethyl linoleate urea-inclusion compound | 1.15 | 0.745 | 65.0 |

It is not proposed that the urea-inclusion compounds be used routinely for the incorporation of fats in diets, but their use is desirable when supplementation with unsaturated fatty acids or esters is necessary. This method of supplementation finds use also whenever an unstable straight chain aliphatic compound must be administered. For example, the continued administration of ethyl esters of tung oil fatty acids via their urea-inclusion compounds has been successfully practiced to avoid the oxidative polymerization of the eleostearic acid present in that oil.

Incorporation of the dietary supplement need not be in the form of complex derived from natural mixtures or concentrates in which the active substance occurs. The pure substance itself may be administered in the form of its urea inclusion compound. In experiments similar to those described above in detail, the same basal diet was fed to rats. Urea inclusion compounds of both purified linoleic acid and its ethyl ester were fed separately, mixed with the basal diet in amounts such that the inclusion compounds were 4% of the total diet. This is equivalent to one per cent of linoleic acid or its ethyl ester in the diet. Administration of such a dietary supplement to rats which were already deficient with regard to essential fatty acids caused a cure of the skin symptoms and an increase in the arachidonic acid content of the rats.

In a parallel experiment, purified linolenic acid and its ethyl ester were fed as urea inclusion compounds (4% of the diet). The linolenate so incorporated in the diet was found to stimulate growth as it normally does. Moreover, the linolenate is not oxidizable in this form.

Arachidonic acid or its esters likewise may be incorporated into diets if added in the form of urea inclusion compounds. This essential fatty acid is not then subject to rancidification and retains its biological potency. More highly unsaturated fatty acids or their esters can be incorporated in diet formulations in their stable urea complexes. Thus, hog liver oil esters, fish liver esters, etc. can be incorporated into diet formulas.

Isomers and derivatives of essential fatty acids have been incorporated in the diets of rats in the form of the urea inclusion compounds. These, although not possessing essential fatty acid activity were protected from autoxidation and were administered to the rats in unaltered stable form. Among fatty acid derivatives which have been administered via urea complexes may be mentioned ethyl-9-cis, 12-trans-linoleate, methyl-12-keto-oleate, ethyl eleostearate, ethyl linolenate and ethyl linoleate.

The invention may be employed for administration of essential fatty acids or other fat derivatives to ruminant animals. The urea inclusion compounds in this case provide two benefits. The necessary essential fatty acids may be included in a compounded ration in stable form insuring that the ruminant animal will receive these essential nutrients even though the ration be stored for long periods of time. Moreover, the urea may be utilized by the ruminant animal as a substitute for some of its protein requirement.

Urea inclusion compounds of unstable therapeutic agents may be used as a means of storage and administration in stable form. Therapeutic substances capable of inclusion in urea are stable in the dry form, and if administered by mouth or injection become immediately available for physiological action.

While the specification sets forth in detail the preferred embodiments of the invention, it will be apparent that they may be varied without departing from the principles of this invention. The scope of the invention is limited only by the terms of the appended claims.

What is claimed is:

1. A method of inhibiting autoxidation and rancidity and lessening the oxidation of oil-soluble vitamins in food compositions containing essential fatty acid compound and at least one oil soluble vitamin compound which comprises reacting the essential fatty acid compound with urea to form a urea-inclusion compound and incorporating that urea-inclusion compound into said food composition.

2. The method according to claim 1 further characterized in that the inclusion compound is present in the food composition in an effective amount not greater than about 15 percent by weight.

3. The method according to claim 1 further characterized in that the essential fatty acid compound is an ester.

4. In the method of supplementing fat and oil soluble vitamin deficient diets which comprises introducing an essential fatty acid compound and at least one soluble vitamin compound into a food composition before ingestion, the improvement which consists in incorporating said essential fatty acid compound in urea to form a complex, whereby autoxidation of the acid compound and resulting rancidity are inhibited and oil soluble vitamin retention of the food composition is materially improved.

5. The method according to claim 4 further characterized in that said essential fatty acid compound-urea complex is present in an effective amount not greater than about 15 percent by weight.

6. In an essential fatty acid compound supplemented food composition for fat deficient diets containing at least one oil soluble vitamin compound the improvement which consists in said essential fatty acid compound being present in an essential fatty acid-urea complex.

7. The food composition according to claim 6 further characterized in that the essential fatty acid compound-urea complex is present in an effective amount not greater than about 15 percent by weight.

References Cited in the file of this patent

Schlenk et al.: Jr. Am. Chem. Soc., November 1950, vol. 72, No. 11, pages 5003–4.

UNITED STATES PATENT OFFICE

CERTIFICATE OF CORRECTION

Patent No. 2,875,060                                              February 24, 1959

Ralph T. Holman

It is hereby certified that error appears in the printed specification of the above numbered patent requiring correction and that the said Letters Patent should read as corrected below.

Column 6, line 14, after "one" insert -- oil --.

Signed and sealed this 23rd day of June 1959.

(SEAL)
Attest:

KARL H. AXLINE                                            ROBERT C. WATSON
Attesting Officer                                        Commissioner of Patents